June 10, 1924.
J. R. SEXSMITH
VEHICLE DIRECTION SIGNAL
1,497,233
Filed July 24, 1923
2 Sheets—Sheet 1
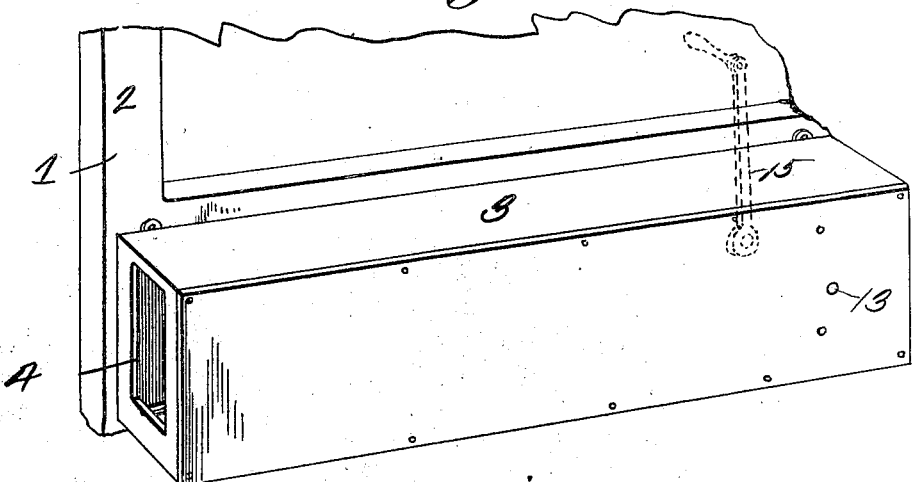
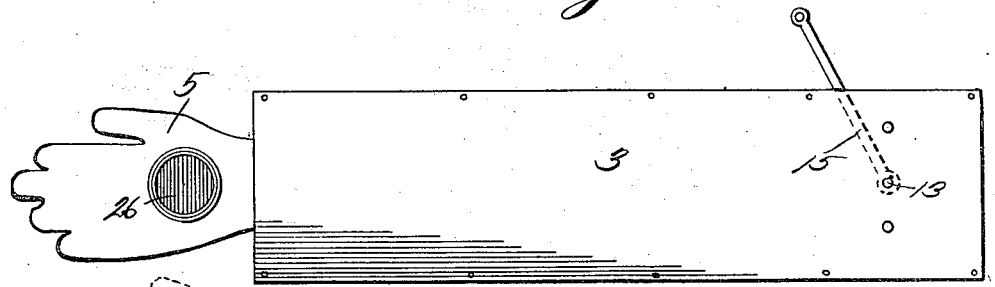
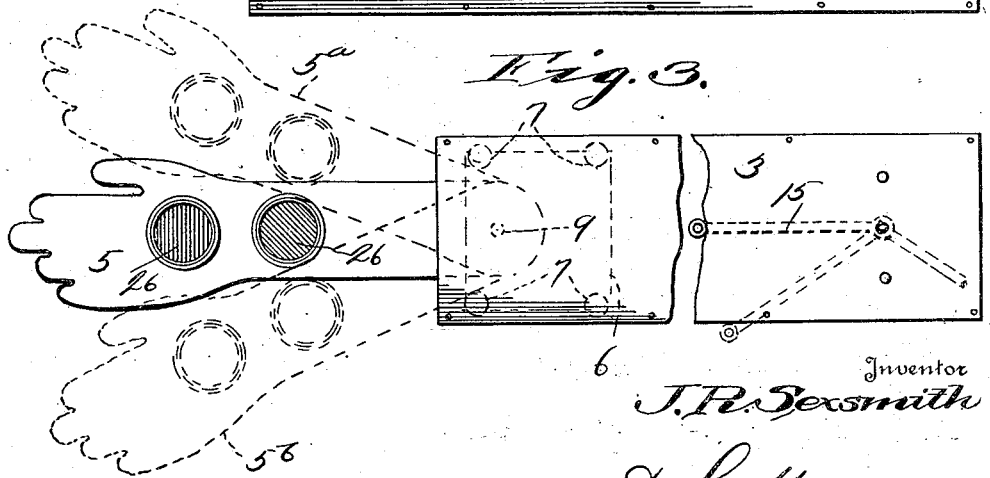
Inventor
J. R. Sexsmith
By D. Swift
Attorney

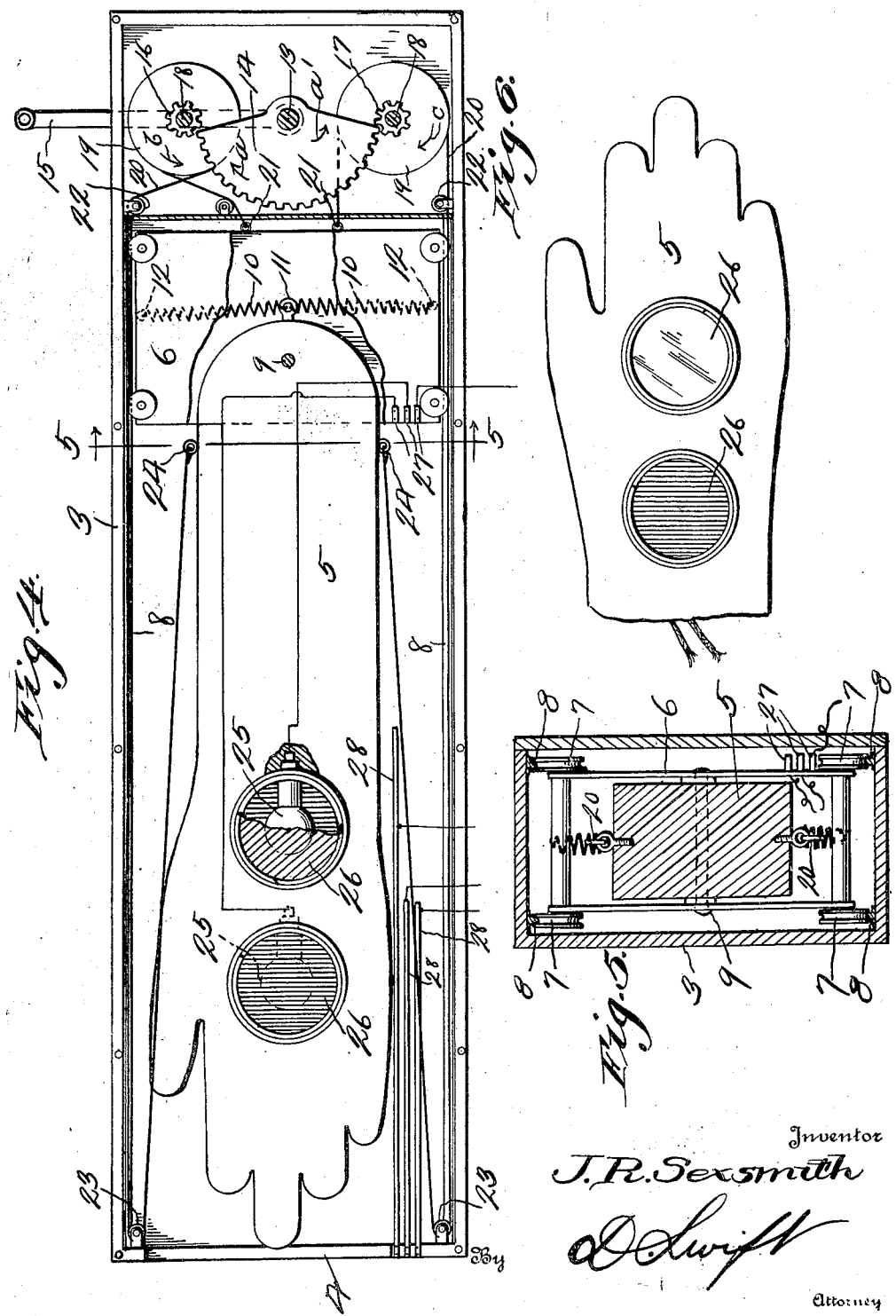

Patented June 10, 1924.

1,497,233

UNITED STATES PATENT OFFICE.

JAMES R. SEXSMITH, OF OLYMPIA, WASHINGTON.

VEHICLE DIRECTION SIGNAL.

Application filed July 24, 1923. Serial No. 653,482.

*To all whom it may concern:*

Be it known that I, JAMES R. SEXSMITH, a citizen of the United States, residing at Olympia, in the county of Thurston, State of Washington, have invented a new and useful Vehicle Direction Signal; and I do hereby declare the following to be a full, clear, and exact description of the invention, such as will enable others skilled in the art to which it appertains to make and use the same.

The invention relates to vehicle direction signals and has for its object to provide a device of this character whereby the operator of a vehicle may easily and quickly signal approaching vehicles from either direction as to the direction of a contemplated turn of the vehicle.

A further object is to provide a vehicle direction signal comprising an elongated casing horizontally disposed and provided with a movable carriage therein, which carriage supports a signalling arm, and when moved outwardly extends the signalling arm beyond the end of the casing, and when moved inwardly moves the signalling arm into the casing out of sight. Also to provide gear and cable means for moving said carriage inwardly and outwardly, said gear and cable means also forming means for inclining the signalling arm upwardly or downwardly for indicating a right or a left turn.

A further object is to provide the signalling arm with signalling lamps, which are lighted upon an outward movement of the signalling arm and extinguished from an inward movement of the signalling arm.

With the above and other objects in view the invention resides in the combination and arrangement of parts as hereinafter set forth shown in the drawing, described and claimed, it being understood that changes in the precise embodiment of the invention may be made within the scope of what is claimed without departing from the spirit of the invention.

In the drawings:—

Figure 1 is a perspective view of the signalling device, showing the same attached to a conventional form of windshield.

Figure 2 is an elevation of the device, showing a red light illuminated for parking purposes and the indicator in a horizontal position.

Figure 3 is a rear elevation of the device, showing the signalling arm extended and in a horizontal position and showing in dotted lines inclined positions of the signalling arm.

Figure 4 is a vertical longitudinal sectional view through the signalling device.

Figure 5 is a vertical transverse sectional view taken on line 5—5 of Figure 4.

Figure 6 is a front elevation of the signalling arm.

Referring to the drawing, the numeral 1 designates a conventional form of windshield of a motor vehicle, 2 the outer side thereof. Secured to the outer side 2 of the windshield is an oblong shaped casing 3, which has its outer end provided with an opening 4, through which opening the signalling arm 5 is moved to a signalling position for signalling approaching vehicles forwardly or rearwardly as to the contemplated turning of the vehicle to the right or left or stopping the vehicle. Disposed within the casing 3 is a longitudinally movable carriage 6, which carriage is provided with grooved guide wheels 7, which engage tracks 8 carried by the upper and lower walls of the casing 3. The carriage 6 is consequently anti-frictionally supported so that it may be moved longitudinally within the casing in a manner whereby noise, such for instance as rattling, incident to a vehicle moving over rough ground is obviated. The signalling arm 5 is pivotally connected at 9 to the carriage 6 and is normally held in a horizontal position by means of a coiled spring 12 which is connected to the eye 11 carried by the arm and to the carriage 6 at 12 adjacent its upper and lower end, therefore it will be seen that when the signalling arm 5 is moved outwardly it will be normally held in a horizontal position, thereby indicating to an approaching vehicle that the operator contemplates a turn to the left. If the arm 5 is tilted upwardly to the dotted line position 5ª, this will indicate to an approaching vehicle that the operator contemplates a right turn, however if the signalling arm 5 is inclined downwardly and outwardly to the dotted line position 5ᵇ it will indicate to approaching vehicles that the operator contemplates stopping. Extending transversely through the inner end of the casing 3 is a shaft 13, and mounted on said shaft is a gear segment 14, which segment may be rotated by the operating handle 15, which handle is adapted to be grasped by the operator for rotating the gear segment 14 into mesh with either the gears 15 or 17 which are carried by transversely disposed shafts 18. Mounted on the shafts 18 are pulleys 19 around which pulleys cables 20 extend, which cables have one of their ends connected at 21 to the carriage 6 and their other ends extending over guide rollers 22, thence forwardly over the pulleys 23 adjacent the forward ends of the casing 3 and thence rearwardly and are anchored the signalling arm 5 at 24 adjacent the pivotal point thereof. It will be seen that when the segment gear 14 is rotated in the direction of the arrow $a$ that the cable pulley 19 adjacent the upper side of the casing 3 will be rotated in the direction of the arrow $b$, thereby imparting a pull on the upper cable 20 and consequently moves the signalling arm 5 outwardly to signalling position beyond the outer end of the casing 3, which signalling arm is supported in its outward movement by means of the carriage 6. After the signalling arm 5 is moved outwardly to a signal position a continued rotation of the pulley 19 will pull upwardly on the signalling arm against the action of the upper spring 10, thereby causing the signalling arm to assume the dotted line position $5^a$ shown in Figure 3, which indicates a right turn. If the additional rotation is not imparted to the upper pulley or drum 19, the arm 5 is held in a horizontal position by the springs 10. A continued rotation of the segment gear 14 in the direction of the arrow $a'$ will rotate the lower pulley 19 in the direction of the arrow $c$, thereby imparting a pull on the carriage 6 and returning the signalling arm 5 to inner inoperative position. A reverse direction of rotation of the pulley 19 at the lower side of the casing will pull the arm 5 outwardly and tilt said arm downwardly in the same manner as when a pull is imparted on the upper cable 20.

The signalling arm 5 has disposed therein electric lamps 25 which are screened by colored glasses 26, which may be varied in color according to usual signalling colors used in connection with motor vehicles. The carriage 6 is provided with spaced contacts 27, which contacts, when the signalling arm 5 is moved to outer position engage contact arms 28 for closing circuits for controlling the lamps 25 or other signalling means.

From the above it will be seen that a vehicle direction signal is provided, which is simple in construction, positive in its operation and one wherein approaching vehicles may be easily and quickly signalled as to the contemplated action of the driver. It will also be seen that the device may be secured to the inner side of the windshield if so desired.

The invention having been set forth what is claimed as new and useful is:—

1. A vehicle direction signalling device comprising a casing, a longitudinally movable carriage disposed within said casing, a signalling arm pivoted to said carriage, spring means for normally maintaining the signalling arm in a horizontal position, pulley and cable means for moving said carriage and arm to operated position, said cable means also forming means whereby the signalling arm may be moved out of a horizontal position in a vertical plane when in operated position 2. A vehicle signal direction indicator, said indicator comprising a casing, a carriage longitudinally movable in said casing, a signal arm pivoted to said carriage and disposed within the casing, spring means for normally maintaining said arm in a horizontal position, pulleys rotatably mounted within the casing, gear means for rotating said pulleys, cables extending around said pulleys, said cables having one of their ends anchored to the carriage and their other ends anchored to the pivoted arm adjacent the carriage, said cables forming means whereby the carriage and arm may be moved to operated position and the arm tilted in a vertical plane.

In testimony whereof I have signed my name to this specification in the presence of two subscribing witnesses.

JAMES R. SEXSMITH.

Witnesses:
F. HOWDAN CORMBDORK,
HARRY PROBST.